United States Patent [19]

Kondo

[11] Patent Number: 5,610,998
[45] Date of Patent: Mar. 11, 1997

[54] APPARATUS FOR EFFECTING A/D CONVERSION ON IMAGE SIGNAL

[75] Inventor: Tetsujiro Kondo, Kanagawa, Japan

[73] Assignee: Sony Corporation, Tokyo, Japan

[21] Appl. No.: 260,373

[22] Filed: Jun. 14, 1994

[30] Foreign Application Priority Data

Jun. 17, 1993 [JP] Japan .................. 5-171124

[51] Int. Cl.⁶ .................. H04N 1/417; H04N 1/415; H04N 1/40; G06K 9/36
[52] U.S. Cl. .................. 382/224; 358/261.2; 358/430; 358/433; 358/445; 358/462; 358/467
[58] Field of Search .................. 358/261.1, 261.2, 358/426, 430, 433, 445, 462, 467, 261.3, 432; 382/10, 48, 56, 50, 224, 251, 270, 272, 273; 348/405, 419; 341/143

[56] References Cited

U.S. PATENT DOCUMENTS

| | | | |
|---|---|---|---|
| 4,516,262 | 5/1985 | Sakurai | 382/224 |
| 4,606,069 | 8/1986 | Johnsen | 358/467 |
| 5,107,345 | 4/1992 | Lee | 358/261.1 |
| 5,166,987 | 11/1992 | Kageyama | 358/426 |
| 5,307,177 | 4/1994 | Shibata et al. | 358/430 |

FOREIGN PATENT DOCUMENTS

| | | |
|---|---|---|
| 0318244 | 5/1989 | European Pat. Off. . |
| 0409602 | 1/1991 | European Pat. Off. . |
| 0479510 | 4/1992 | European Pat. Off. . |
| 0531923 | 3/1993 | European Pat. Off. . |

OTHER PUBLICATIONS

IEEE International Conference On Communications Bostonicc/89, vol. 3, 14 Jun. 1989, Boston pp. 1355–1359 H. Sun et al. 'Adaptive Interleaved Vector Quantization For Image Transmission' par. 3; figures 1–3.

*Primary Examiner*—Edward L. Coles, Sr.
*Assistant Examiner*—Kimberly A. Williams
*Attorney, Agent, or Firm*—William S. Frommer; Alvin Sinderbrand

[57] ABSTRACT

An apparatus for coding an input analog video signal to a digital code. The apparatus comprises an A/D converter for converting the input analog video signal to a first quantization code having a first number of bits, a class sorting circuit supplied with the first quantization code from the A/D converter, for effecting a class sorting process on a plurality of pixels including a pixel to be marked, based on the first quantization code corresponding to the pixel and the first quantization code corresponding to each of the pixels provided near the periphery of the pixel, and a quantizing circuit supplied with the first quantization code produced from the A/D converter and the result of class sorting by the class sorting means, for adaptively converting the first quantization code into a second quantization code having a second number of bits smaller than the first number of bits, based on the result of class sorting by the class sorting circuit.

8 Claims, 4 Drawing Sheets

LINE L(n-1) —— o      o      o

LINE L(n) —— o      ⊘      o
                          ↖ PIXEL TO BE MARKED

LINE L(n+1) —— o      o      o

APPARATUS FOR EFFECTING A/D CONVERSION ON IMAGE SIGNAL

BACKGROUND OF THE INVENTION

1. Field of the Invention

The present invention relates to a circuit for quantizing image data used for representing analog image data in the form of a digital quantization code having a predetermined number of bits.

2. Description of the Related Art

In general, a method for effecting A/D conversion on analog image data has heretofore been carried out in the following manner. That is, the range of values corresponding to the differences between the maximum values and the minimum values both selectable by respective pixels of an original image is divided according to the number of bits capable of being taken out as an output. Each of divided level ranges corresponding to the taken-out number of bits is represented in the form of a code using the corresponding number of bits. It is next decided to which level range the level of each pixel belongs. Further, a code indicative of the divided level range to which the level of each pixel belongs, is taken out as a digital output signal. In this case, as a decode level (decode representative level) of the code which represents each divided level range at the time that an D/A converting process is effected, a central value of each level range is used.

This method is equivalent to a method of minimizing quantization distortion developed in each pixel unit. When the level division is uniformly carried out, it is subjected to linear quantization. On the other hand, when the level division is uniformly made depending on the probability of development of a pixel level, it is subjected to nonlinear quantization. However, the norm of minimizing the quantization distortion developed in each pixel unit is applied even to either case as it is.

Since the above-described A/D converting method can minimize a quantization error developed for each pixel and provide a satisfactory S/N ratio, the analog level of the original pixel can be replaced with a decode representative level nearest to its analog level.

However, the A/D converting method has a problem in that although it is quantitatively satisfactory, visually remarkable deterioration is often developed in the restored or reproduced image. That is, this occurs because a human being sees or takes an image as a time variation (motion) in image or a spatial variation (details such as resolution, an outline or contour of an image, etc.) in image without taking the image as one pixel unit.

When such a variation that the level of an image signal abruptly rises and reaches a flat level occurs as indicated by a solid line in FIG. 6, for example, a decode signal at the time that the conventional A/D conversion for minimizing the quantization distortion for each pixel is effected is represented as indicated by a solid line b (corresponding to a line formed by connecting points indicated by black circles or dots to one another). Even in the case of a range FW indicative of the flat level, the signal is brought into a "jagged or notched" state and is not faithful to a visual variation.

Such notches give rise to deterioration in image when the reproduced image is seen with human eyes. When the notches are developed in a time direction, they are brought to so-called jerkiness. A so-called edge busyness appears at an edge portion extending in a spatial direction, whereas so-called mosquito noise is produced at a flat portion.

Thus, the conventional A/D converting apparatus has been designed uniformly based on the standard for minimizing the quantization distortion for each pixel and has been out of accord with a human visual characteristic. The more the number of bits increases, the more visual deterioration in image is made nonprominent. However, the conventional A/D converting apparatus has a problem in that since the quantized number of bits corresponding to an output signal is fixed, an increase in the quantized number of bits runs to waste and the efficiency of transmission is reduced in the case of such an image that the visual deterioration is not developed.

Even in the case of images which are in accord with the human visual characteristic, they are different in desired or favorite image quality from each other according to differences among individuals. Since the conventional A/D converting method can simply obtain the uniform image created under the standard for minimizing the quantization distortion for each pixel, as each reproduced or restored image, only a method of effecting adjustments such as contrast, tints, sharpness, etc. on a reproduced analog image signal was used to set each image to the desired quality of image.

SUMMARY OF THE INVENTION

With the forgoing in view, it is therefore an object of this invention to provide an apparatus for effecting A/D conversion on an image signal, which is capable of providing various quality levels of reproduced images and various quantized number of bits.

In order to solve the above problems, there is provided an apparatus for effecting A/D conversion on an image signal, according to this invention, which, when reference numerals employed in an embodiment to be described later are associated with the following components, comprises:

an A/D converter 2 for converting the image signal into a first quantization code having an increased number of bits;

class sorting means 5 for effecting a sorting process on a pixel to be marked, according a pattern formed by a plurality of pixels provided near the periphery of the pixel and including the pixel to be marked; and requantizing means 4 for adaptively requantizing a quantization code corresponding to the above pixel produced from the A/D converter 2 according to the result of sorting by the class sorting means 5 and a quality-of-image or image-quality switching signal and converting such a quantization code into a second quantization code having the number of bits not greater than that of the first quantization code.

According to the invention having the above construction, the class sorting means 5 classifies the pixel to be marked into either one of a flat portion, an edge portion, an extreme-value portion, etc. according to the pattern formed by the plurality of pixels near the periphery of the pixel. According to the desired or favorite quality of an image designated based on the image-quality switching signal, the requantizing means 4 effects an adaptive requantizing process for taking great account of a pattern portion necessary as the above quality of image, for example, on each pixel data output from the A/D converter.

When, for example, the term pixel fidelity (identical to that employed upon the conventional A/D conversion) is selected based on the image-quality switching signal, a pixel code output from the A/D converter 2 is requantized in the form of a fewer second number of bits. When the number of bits in the A/D converter 2 is 10 bits, for example, a code represented in the eight leftmost bits is selected and output by the requantization. The number of bits produced by the requantization can be easily changed based on a switching signal.

When the term great importance to the visual characteristic is selected based on the image-quality switching signal, an adaptive requantizing process is effected on, for example, a flat portion so as to produce a flat output. The number of bits at this time may be fixed to the number of bits selected based on a number-of-bits switching signal. However, the number of bits may be changed for each pixel.

According to the A/D converting apparatus of this invention, as has been described above, a quantized output code capable of obtaining the quality of an image according to user's preference can be obtained.

Further, the number of bits to be output can be set according to the user's preference. Since the number of bits can be changed depending on the contents of an image, image data can be output on a low bit-rate basis.

BRIEF DESCRIPTION OF THE DRAWINGS

While the specification concludes with claims particularly pointing out and distinctly claiming the subject matter which is regarded as the invention, it is believed that the invention, the objects, features and advantages thereof will be better understood from the following description taken in connection with the accompanying drawings in which:

DETAILED DESCRIPTION OF THE PREFERRED EMBODIMENT

One embodiment of an apparatus for effecting A/D conversion on an image signal, according to this invention will hereinafter be described with reference to the accompanying drawings.

Figure 1:
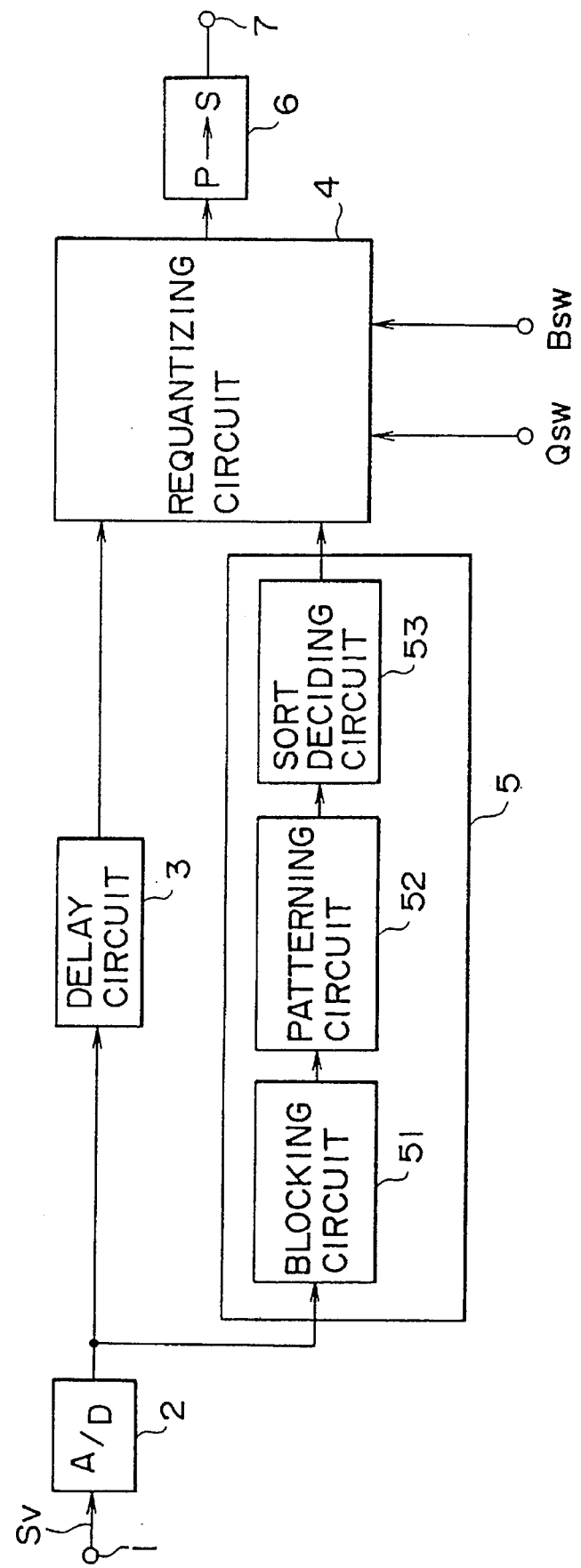
FIG. 1 is a block diagram illustrating one embodiment of an A/D converting apparatus according to the present invention.

FIG. 1 is a block diagram showing one embodiment of an A/D converting apparatus according to this invention. An analog image signal Sv input through an input terminal 1 is supplied to an A/D converter 2, where each of pixel samples thereof sampled at a predetermined sampling frequency is converted into a quantization code having the number of bits greater than the number of bits required as an output. In the present embodiment, each of the pixel samples of the input analog image signal Sv is converted into digital pixel data represented in the form of a 10-bit quantization code. The A/D converter 2 is of a conventional A/D converter based on the norm of minimizing quantization distortion.

The pixel data output from the A/D converter 2 is supplied via a delay circuit 3 used for simultaneous action to a requantizing circuit 4 where each of the pixel sample data is requantized in the form of an adaptive code having the number of bits less than or equal to 10 bits in a manner to be described later.

The pixel data output from the A/D converter 2 is supplied to a class sorting circuit 5. The class sorting circuit 5 comprises a blocking circuit 51, a patterning circuit 52 and a sort deciding circuit 53. The blocking circuit 51 forms a block based on nine pixels shown in FIG. 2, for example, in which a marked pixel processed by the requantizing circuit 4 is set as the center.

The nine pixels are the very ones to be laid out or arranged on the screen and comprise three pixels which are arranged along a line L(n−1) provided one line ahead of a line L(n) including the pixel to be marked and which are situated in positions spatially near the pixel, the pixel arranged along the line L(n) and two pixels situated before and after the pixel, and three pixels which are arranged along a line L(n+1) provided one line after as seen from the line (n) including the pixel and which are situated in positions spatially near the pixel.

Figures 2, 3:
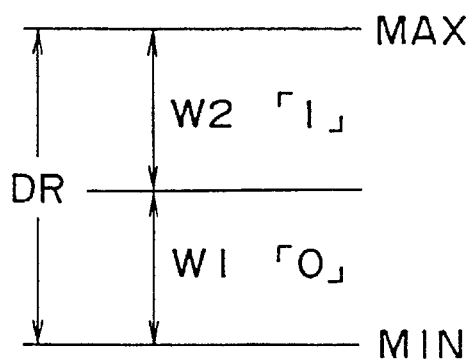
FIG. 2 is a view for describing an operation of a partial circuit employed in the one embodiment of the present invention.
FIG. 3 is a view for explaining another operation of the partial circuit employed in the one embodiment of the present invention.

Next, the patterning circuit 52 converts the block comprised of the nine pixels into data convenient to decide to what kind of pixel pattern the block corresponds. In the present embodiment, as shown in FIG. 3, the minimum value MIN of values of the pixels in the block is subtracted from the maximum value MAX of the values to determine a dynamic rage DR. Further, the dynamic range DR is uniformly divided into two corresponding to level ranges W1 and W2, and one-bit codes "0" and "1" are respectively set to the level ranges W1 and W2. Thereafter, each pixel is represented in the form of the one-bit code depending on determining to which level range of the W1 and W2 each of the nine pixels in the block belongs. That is, each pixel data is requantized in the form of one bit data.

Thus, a set of the nine pixels, each of which is represented in the form of one bit, can be regarded or taken as a predetermined pattern comprised of "0" and "1" in a two-dimensional space. Patterning information about the block is supplied to the sort deciding circuit 53. The sort deciding circuit 53 decides, based on the information supplied from the patterning circuit 52, to which plxel pattern the corresponding pixel to be marked belongs to thereby effect a class sorting process. As a result, its class sort is decided. The sort deciding circuit 53 classifies or divides the pixel into a class such as a flat portion in which variations in time and space are low, an edge (outline) of a predetermined image, an extreme-value portion-much different from other portions, or the like. Thereafter, the sort deciding circuit 53 outputs information indicative of the result of division therefrom. Further, the sort deciding circuit 53 supplies the information to the requantizing circuit 4.

The delay circuit 3 provides a delay time interval corresponding to a time interval required for the class sorting circuit 5 to electrically process the pixel to be marked. 10-bit data for the pixel to be marked and the information indicative of the result of division are made concurrent and supplied to the requantizing circuit 4.

The requantizing circuit 4 is supplied with an image-quality switching signal QSW and a number-of-bits switching signal BSW. In the present embodiment, the image-quality switching signal QSW is of a signal determined depending on the switching action of a changeover switch (not shown) having switching positions for the fidelity of each pixel (minimal quantization of quantization distortion for each pixel unit, which is similar to the conventional example), serious consideration of a visual characteristic, enhancement, edge enhancement, etc. Further, the number-of-bits switching signal BSW is of a signal for setting the number of bits less than or equal to 10 bits or the number of bits less than or equal to 8 bits in the present embodiment depending on the switching action of a number-of-bits changeover switch (not shown).

When the switching position for the pixel fidelity is selected based on the image-quality switching signal QSW, the requantizing circuit 4 requantizes pixel data based on the number of bits designated or specified in accordance with the number-of-bits switching signal BSW. When 8 bits are specified in accordance with the number-of-bits switching signal BSW, for example, the requantizing circuit 4 outputs the eight leftmost bits of the 10-bit data supplied thereto from the delay circuit 3.

On the other hand, when the switching position for the serious consideration of the visual characteristic is selected based on the image-quality switching signal QSW, the requantizing circuit 4 requantizes pixel data into an adaptive code coincident with the visual characteristic as will be described below. That is, when an pixel sorted as being the flat portion by the class sorting circuit 5 is selected, for example, the pixel is quantized to an adaptive code in which a difference in time between the pixel and the previous pixel has been taken into consideration. Even in this case, the number of bits corresponding to an output code is decided based on the number-of-bits switching signal BSW.

Figure 4:
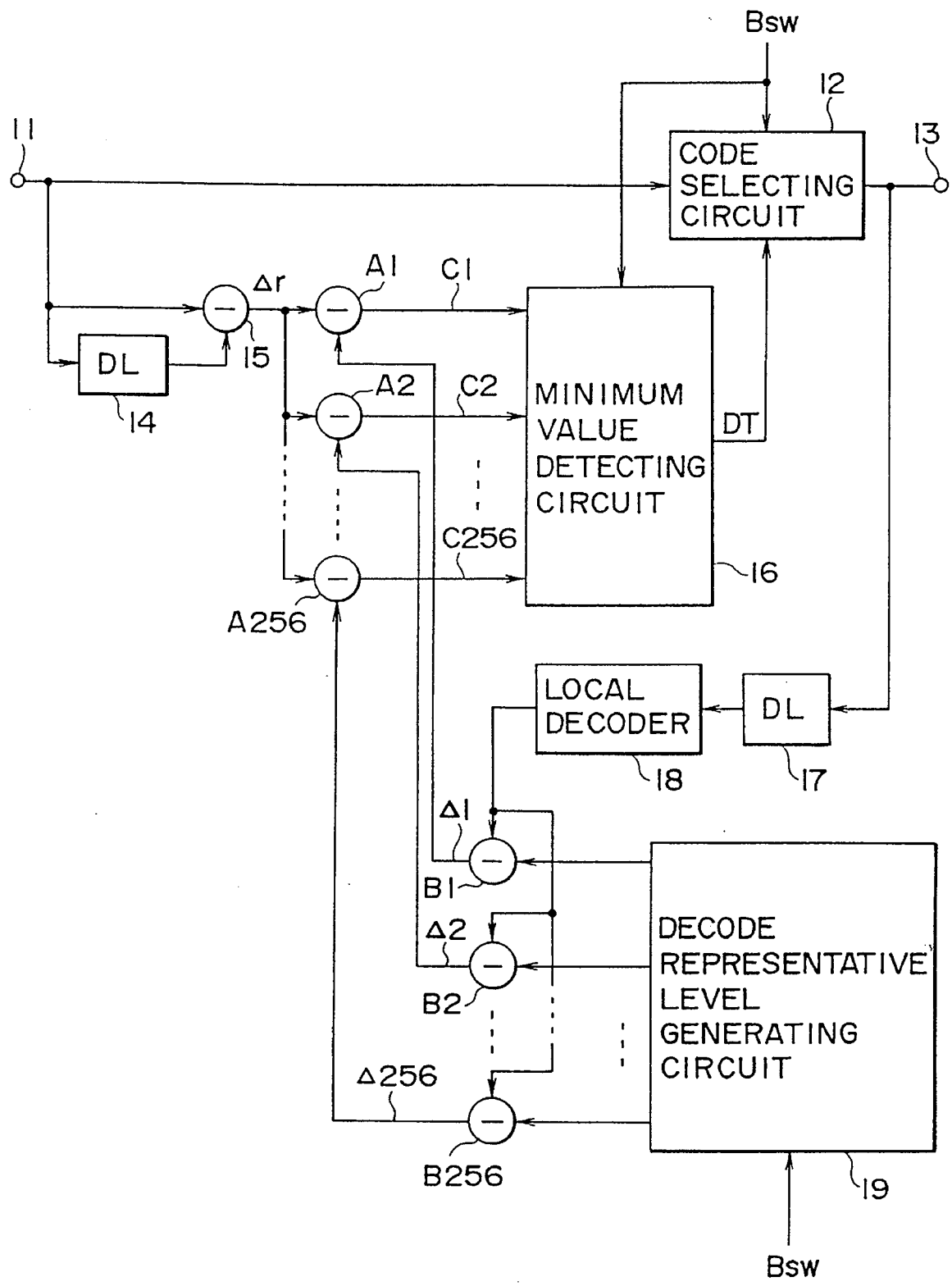
FIG. 4 is a block diagram illustrating one example of the partial circuit employed in the one embodiment of the present invention.

FIG. 4 is a block diagram of a requantizing circuit for quantizing a pixel sorted as being a flat portion by the class sorting circuit 5 when the switching position for the serious consideration of the visual characteristic is selected.

Pixel data input from an input terminal 11 is supplied to a code selecting circuit 12 from which the number of bits selected in response to the number-of-bits switching signal BSW, e.g., a 8-bit output code is taken out. However, an operation for deciding which code should be outputted is controlled based on a control signal DT to be described later.

That is, the pixel data input from the input terminal 11 is suppled to a subtraction circuit 15 through a one-pixel sample type delay circuit 14 and directly supplied to the subtraction circuit 15. As a result, a difference Δr in time between the pixel to be marked and the previous pixel is obtained.

Further, the 8-bit output code produced from the code selecting circuit 12 is suppled via a one-pixel sample type delay circuit 17 to a local decoder 18 where it is converted into a 10-bit decode level. Next, each of subtraction circuits B1 through B256 subtracts the 10-bit decode level produced from the local decoder 18 from each of decode representative levels which are supplied from a decode representative level generating circuit 19 and in which values corresponding to 256 steps selectable by the 8-bit code are represented in the form of 10 bits to thereby obtain each of expected differences D1 through D256 between a decode level of a pixel prior to the pixel to be marked and individual decode representative levels corresponding to 256.

Outputs corresponding to the differences Δ1 through Δ256, which are produced from the subtraction circuits B1 through B256, are supplied to their corresponding subtraction circuits A1 through A256 where differences between the output Δr produced from the subtraction circuit 15 and the individual outputs Δ1 through Δ256 are calculated. Outputs C1 through C256 corresponding to the differences, which are produced from the subtraction circuits A1 through A256, are supplied to a minimum value detecting circuit 16 where the minimum one of the outputs C1 through C256 is detected. Thereafter, the detected output is supplied to the code selecting circuit 12 as the control signal DT. The minimum differential output C means that the amount of change in the expected value is nearest to the amount of change Δr in the true value. A code in which a decode representative level related to the minimum one of the differential outputs C1 through C256 is represented in the form of 8 bits, is output from the code selecting circuit 12.

Figure 6:
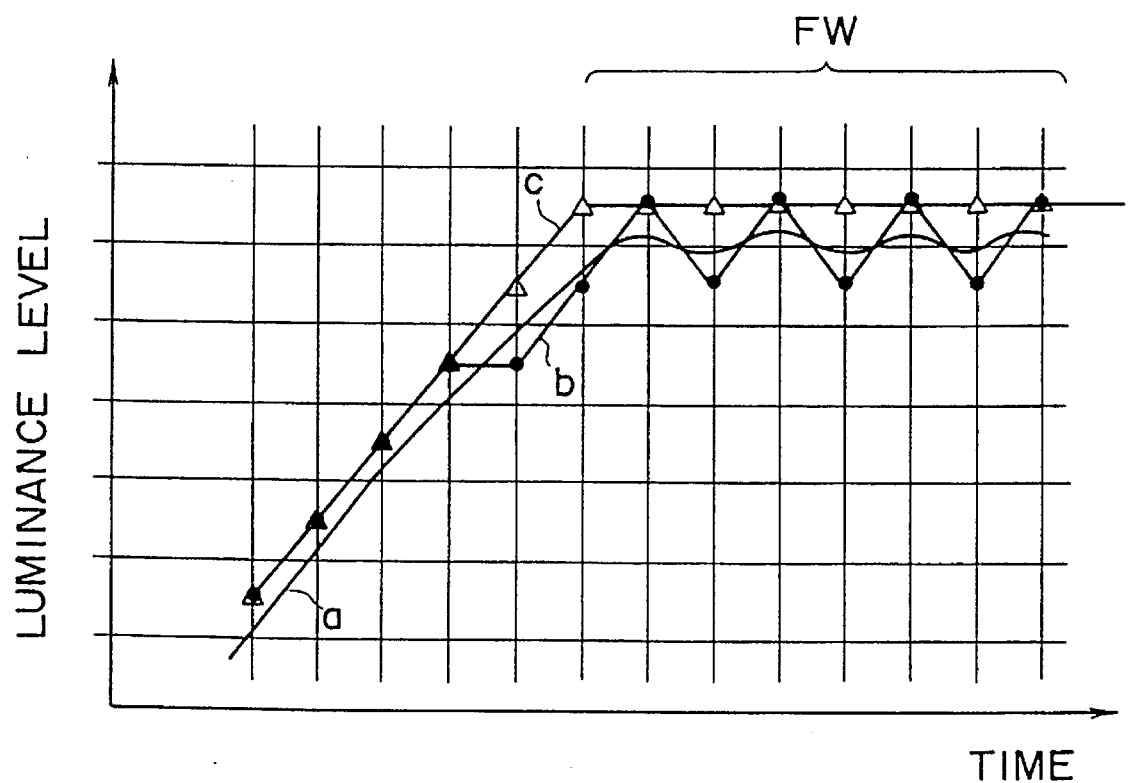
FIG. 6 is a view for describing one example of quantized outputs of a conventional A/D converting apparatus and the A/D converting apparatus shown in FIG. 1.

According to the above quantization with respect to the serious consideration of the visual characteristic, an image signal indicated by a solid line a in FIG. 6 is adaptively coded (quantized) as indicated by a solid line c (line formed by connecting points corresponding to Δ in FIG. 6 to each other) in FIG. 6 upon decoding the image signal so that the flat portion is formed like the visual characteristic. At this time, the number of bits corresponds to the number of bits designated based on the number-of-bits switching signal.

The above process shows the case where the output number of bits quantized by the requantizing circuit 4 is 8 bits. Even when the number of bits below the 8 bits is specified, it is needless to say that the above process is effected. Therefore, the number-of-bits switching signal BSW is also supplied to each of the decode representative-level generating circuit 19 and the minimum value detecting circuit 16. The decode representative level generating circuit 19 outputs decode representative levels (where the number of bits is 10) of steps corresponding to the number of bits selected based on the number-of-bits switching signal BSW to their corresponding subtraction circuits B1 through B (the number of steps corresponding to the number of bits). Further, the minimum value detecting circuit 16 detects only outputs supplied from the subtraction circuits A1 through A (the number of steps corresponding to the number of bits).

Figure 5A:
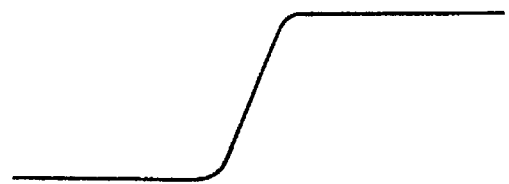
FIG. 5 is a view for describing a further operation of the partial circuit employed in the one embodiment of the present invention.
Figure 5B:
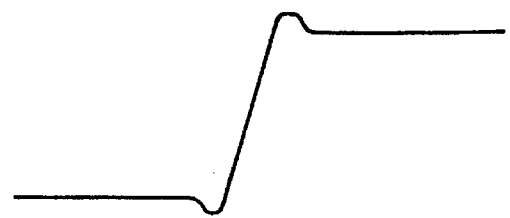

When the switching position for the edge enhancement is selected based on the image-quality switching signal QSW, the requantizing circuit 4 adaptively requantizes the pixel subjected to the class sorting as being the edge portion by the class sorting circuit 5 into a quantization code like that provides outline or contour enhancement when the original signal shown in FIG. 5A is decoded as shown in FIG. 5B.

The pixel data requantized in the above-described manner is converted into serial data by a parallel-to-serial converting circuit 6 and the converted serial data is output to an output terminal 7.

In the above embodiment, the quantized number of bits of the pixel data obtained at the output terminal 7 is represented as a constant value switchably set based on the number-of-bits switching signal BSW. However, the number of bits may be changed for each pixel depending on the result of division by the class sorting circuit. For example, the edge of the image may be outputted on a high bit basis and the flat portion may be outputted on a low bit basis. In this case, the number of bits to be output may be changed in the following manner. That is, the output of the parallel-to-serial converting circuit 6 is supplied to a bit-rate monitoring circuit where the bit rate of pixel data for each field or each frame, for example, is detected. Further, the output of the bit-rate monitoring circuit is fed back to the requantizing circuit 4 to thereby change the output number of bits about the pixel data requantized by the requantizing circuit 4 in such a manner that the bit rate to be transmitted is held constant in the case of a block unit of a predetermined quantity of data or in the case of either one field unit or one frame unit.

Having now fully described the invention, it will be apparent to those skilled in the art that many changes and modifications can be made without departing from the spirit or scope of the invention as set forth herein.

What is claimed is:

1. A method of coding an input analog video signal to a digital code, comprising the following steps:

a first step for converting the input analog video signal into a first quantization code having a first number of bits;

a second step for receiving said first quantization code from said A/D converter and effecting a class sorting process on a plurality of pixels including a pixel to be marked, based on said first quantization code corresponding to said pixel and said first quantization code corresponding to each of the pixels provided near the periphery of said pixel;

a third step for receiving said first quantization code produced from said A/D converter and the result of class sorting by said class sorting means and adaptively converting said first quantization code into a second quantization code having a second number of bits smaller than the first number of bits, based on the result of class sorting by said class sorting means; and a fourth step for receiving a bit switching signal to thereby select the second number of bits based on said bit switching signal, said third step comprising the following steps of:

making a difference between said pixel to be marked and a pixel prior to said pixel to be marked so as to generate a first differential value;

generating a plurality of kinds of codes each represented in the form of the second number of bits;

receiving said first quantization code, converting said first quantization code into said second quantization code having the second number of bits and outputting the converted second quantization code therefrom;

decoding said second quantization code output from said code outputting means to the code having the first number of bits;

receiving an output produced from said local decoder and the plurality of kinds of codes output from said representative code generating means and making differences between said output and said plurality of kinds of codes so as to generate a plurality of second differential values;

making differences between said first differential value and said plurality of second differential values so as to generate a plurality of third differential values; and detecting the minimum one of said plurality of third differential values, whereby said code outputting means is controlled based on the result of detection by said detecting means when the plurality of pixels including said pixel to be marked are divided into a class corresponding to a flat portion having a reduced variation in luminance by said class sorting means.

2. An apparatus for coding an input analog video signal to a digital code, comprising:

an A/D converter for converting the input analog video signal into a first quantization code having a first number of bits;

class sorting means supplied with said first quantization code from said A/D converter and for effecting a class sorting process on a plurality of pixels including a pixel to be marked, based on said first quantization code corresponding to said pixel and said first quantization code corresponding to each of the pixels provided near the periphery of said pixel; and quantizing means supplied with said first quantization code produced from said A/D converter and the result of class sorting by said class sorting means and for adaptively converting said first quantization code into a second quantization code having a second number of bits smaller than the first number of bits, based on the result of class sorting by said class sorting means, said quantizing means comprising:

first difference generating means for making a difference between said pixel to be marked and a pixel prior to said pixel to be marked so as to generate a first differential value;

representative code generating means for generating a plurality of kinds of codes each represented in the form of the second number of bits;

code outputting means supplied with said first quantization code, for converting said first quantization code into said second quantization code having the second number of bits and outputting the converted second quantization code therefrom;

a local decoder for decoding said second quantization code output from said code outputting means to the code having the first number of bits;

second difference generating means supplied with the output of said local decoder and the plurality of kinds of codes output from said representative code generating means and for making differences between said output and said plurality of kinds of codes so as to generate a plurality of second differential values;

third difference generating means for making differences between said first differential value and said plurality of second differential values so as to generate a plurality of third differential values; and detecting means for detecting the minimum one of said plurality of third differential values, whereby said code outputting means is controlled based on the result of detection by said detecting means when the plurality of pixels including said pixel to be marked are divided into a class corresponding to a flat portion having a reduced variation in luminance by said class sorting means.

3. An apparatus for coding an input analog video signal to a digital code, comprising:

an A/D converter for converting the input analog video signal into a first quantization code having a first number of bits;

class sorting means for receiving said first quantization code from said A/D converter and for determining which class from a plurality of predetermined classes a plurality of pixels including a pixel to be marked belongs based on said first quantization code corresponding to said pixel to be marked and said first quantization code corresponding to each of the pixels provided near the periphery of said pixel to be marked; and quantizing means for receiving said first quantization code produced from said A/D converter and the class determined by said class sorting means and for adaptively converting said first quantization code into a second quantization code having a second number of bits smaller than the first number of bits based on the class determined by said class sorting means, wherein said quantizing means is supplied with a bit switching signal and selects the second number of bits based on said bit switching signal.

4. An apparatus for coding an input analog video signal to a digital code, comprising:

an A/D converter for converting the input analog video signal into a first quantization code having a first number of bits;

class sorting means for receiving said first quantization code from said A/D converter and for determining which class from a plurality of predetermined classes, which includes a class corresponding to a flat portion in which luminance variation is relatively low, a plurality of pixels including a pixel to be marked belongs based on said first quantization code corresponding to said pixel to be marked and said first quantization code corresponding to each of the pixels provided near the periphery of said pixel to be marked; and quantizing means for receiving said first quantization code produced from said A/D converter and the class determined by said class sorting means and for adaptively converting said first quantization code into a second quantization code having a second number of bits smaller than the first number of bits based on the class determined by said class sorting means.

5. An apparatus for converting an input analog video signal to a digital code, comprising:

an A/D converter for converting the input analog video signal into a first quantization code having a first number of bits;

class sorting means for receiving said first quantization code from said A/D converter and for detecting a characteristic of a plurality of pixels including a pixel to be marked, based on said first quantization code corresponding to said pixel to be marked and said first quantization code corresponding to each of said plurality of pixels provided near the periphery of said pixel to be marked and for determining a class corresponding to said pixel to be marked from a plurality of predetermined classes, based on said characteristic; and quantizing means for receiving said first quantization code produced from said A/D converter, the class determined by said class sorting means and a bit switching signal which designates a number of bits, and for adaptively converting said first quantization code of said pixel to be marked into a second quantization code corresponding to said class determined by said class sorting means and having a second number of bits smaller than the first number of bits based on said bit switching signal.

6. An apparatus for converting an input analog video signal to a digital code, comprising:

an A/D converter for converting the input analog video signal into a first quantization code having a first number of bits;

class sorting means for receiving said first quantization code from said A/D converter and for detecting a characteristic of a plurality of pixels including a pixel to be marked, based on said first quantization code corresponding to said pixel to be marked and said first quantization code corresponding to each of said plurality of pixels provided near the periphery of said pixel to be marked and for determining a class corresponding to said pixel to be marked from a plurality of predetermined classes, based on said characteristic; and quantizing means for receiving said first quantization code produced from said A/D converter, the class determined by said class sorting means, an image-quality switching signal which designates an image quality characteristic of an image, and a bit switching signal which designates a number of bits, and for adaptively converting said first quantization code of said pixel to be marked into a second quantization code based on said class determined by said class sorting means and said image-quality switching signal and having a second number of bits smaller than the first number of bits based on said bit switching signal.

7. A method for converting an input analog video signal to a digital code, comprising the steps of:

converting the input analog video signal into a first quantization code having a first number of bits;

receiving said first quantization code and detecting a characteristic of a plurality of pixels including a pixel to be marked, based on said first quantization code corresponding to said pixel to be marked and said first quantization code corresponding to each of said plurality of pixels provided near the periphery of said pixel to be marked;

determining a class corresponding to said pixel to be marked from a plurality of predetermined classes, based on said characteristic;

receiving said first quantization code, the determined class and a bit switching signal which designates a number of bits; and adaptively converting said first quantization code of said pixel to be marked into a second quantization code corresponding to said determined class and having a second number of bits smaller than the first number of bits based on said bit switching signal.

8. A method for converting an input analog video signal to a digital code, comprising the steps of:

converting the input analog video signal into a first quantization code having a first number of bits;

receiving said first quantization code and detecting a characteristic of a plurality of pixels including a pixel to be marked, based on said first quantization code corresponding to said pixel to be marked and said first quantization code corresponding to each of said plurality of pixels provided near the periphery of said pixel to be marked;

determining a class corresponding to said pixel to be marked from a plurality of predetermined classes, based on said characteristic;

receiving said first quantization code, the determined class, an image-quality switching signal which designates an image quality characteristic of an image, and a bit switching signal which designates a number of bits; and adaptively converting said first quantization code of said pixel to be marked into a second quantization code based on said determined class and said image-quality switching signal and having a second number of bits smaller than the first number of bits based on said bit switching signal.

* * * * *